United States Patent [19]

Kuma et al.

[11] Patent Number: 5,466,472
[45] Date of Patent: Nov. 14, 1995

[54] PROCESS FOR THE PRODUCTION OF A CULTURED MILK BEVERAGE

[75] Inventors: Yoshiharu Kuma; Tamotsu Setoyama; Hideaki Maruyama; Makiko Kawai, all of Tokyo, Japan

[73] Assignee: Kabushiki Kaisha Yakult Honsha, Tokyo, Japan

[21] Appl. No.: 925,662

[22] Filed: Aug. 7, 1992

[30] Foreign Application Priority Data

Aug. 23, 1991 [JP] Japan ................................. 3-235667

[51] Int. Cl.$^6$ ............................................ A23C 9/12
[52] U.S. Cl. ............................ 426/43; 426/34; 426/42; 426/580; 426/583
[58] Field of Search .................. 426/34, 42, 43, 426/580, 583, 584, 590, 658

[56] References Cited

U.S. PATENT DOCUMENTS

| 4,435,389 | 3/1984 | Mutai et al. | |
| 4,944,952 | 7/1990 | Kobayashi et al. | 426/42 |
| 5,032,509 | 7/1991 | Matsumoto et al. | 426/42 X |

FOREIGN PATENT DOCUMENTS

| 0307523 | 3/1989 | European Pat. Off. |
| 2299582 | 12/1990 | Japan. |
| 1512890 | 6/1978 | United Kingdom. |

OTHER PUBLICATIONS

Tamime et al., Yoghurt Science and Technology, 1985, Pergamon Press, Oxford, p. 393.
Tamine, A. Y. and Robinson, R. K., Yoghurt Science and Technology, 1985, pp. 8, 32, 33, 236, 276, 277, and 372, Pergamon Press, Oxford.
Patent Abstracts of Japan, vol. 11, No. 365 (C–460)(2812), Nov. 27, 1987, & JP–A–62–138–147, Jun. 20, 1987, Sakanori Ideie, et al., "Formula Feed of Galactooligosaccharide".
Patent Abstracts of Japan, vol. 15, No. 76 (C–0809), Feb. 21, 1991, & JP–A–2–299–582, Dec. 11, 1990, Matsumoto Keisuke, et al., "Proliferation Promoting Agent and Production Thereof".

*Primary Examiner*—Leslie A. Wong
*Attorney, Agent, or Firm*—Oblon, Spivak, McClelland, Maier & Neustadt

[57] ABSTRACT

A cultured milk beverage contains at least $3 \times 10^8$ cells/ml of at least one type of lactic acid bacterium selected from the group consisting of *Lactobacillus casei*, *Lactobacillus acidophilus*, *Lactobacillus helveticus* and *Lactobacillus jugurti* and a mixture of a galactooligosaccharide, which is represented by the following formula:

$$\text{Gal-(Gal)}_n\text{-Glc}$$

wherein Gal means a galactose residual group, Glc denotes a glucose residual group, and n stands for an integer of 1–4, and a galactosyldisaccharide represented by the following formula:

$$\text{Gal-R}$$

wherein R means a galactose residual group or a glucose residual group, and Gal has the same meaning as defined above, said galactosyldisaccharide being other than lactose. The cultured milk beverage can be produced providing the lactic acid bacterium and culturing the same to a population of at least $3 \times 10^8$ cells/ml of the cultured milk beverage and then adding the mixture of the galactooligosaccharide and the galactosyldisaccharide to the resultant culture.

5 Claims, No Drawings

PROCESS FOR THE PRODUCTION OF A CULTURED MILK BEVERAGE

BACKGROUND OF THE INVENTION

1) Field of the Invention

This invention relates to a cultured milk beverage having excellent intestine reachability, a large viable count and superb flavor and also to a production process thereof.

2) Description of the Related Art

The viable count of lactic acid bacteria in a cultured milk beverage should desirably be as great as possible, because a greater viable count is expected to result in the arrival of more lactic acid bacteria at the intestinal tract in a viable state so that they exhibit useful physiological action. For example, the MHW (Ministry of Health and Welfare) Decree on the Standards and the Like for Ingredients in Milk and Other Dairy Products specifies that the viable count of lactic acid bacteria in a cultured milk beverage shall be at least $1.0 \times 10^6$ cells/ml.

A greater viable count in a cultured milk beverage, however, leads to the production of lactic acid and other fermentation products in larger amounts by lactic acid bacteria during the lactic acid fermentation in its production process or during the period of from its shipping from the plant to its consumption, whereby the flavor and taste of the beverage tends to be altered. In view of the stability of the flavor and taste of a product, there has hence been an obvious limitation to an increase in the viable count. In particular, certain types of lactic acid bacteria which have a greater chance to reach the intestinal tract in a viable state after being taken and therefore are considered preferable from the viewpoint of health promotion effects—generally tend to produce characteristic fermentation products. It has therefore been difficult to produce a delicious cultured milk beverage of a high viable count by relying upon the above technique alone.

Accordingly, conventional cultured milk beverages available on the market and having a viable count of $10^8$ cells/ml or so are either those produced by using only a particular type of lactic acid bacterium, said type being capable of affording products of good flavor and taste even if its intestine reachability may not be good (for example, *Streptococcus thermophilus*), or those produced by using a specific type of lactic acid bacterium of good intestine reachability in an amount range permissible in view of the flavor and taste of the products in combination with another specific type of lactic acid bacterium which can afford products of good flavor and taste.

As has been described above, to allow more cells to reach the intestinal tract in a viable state when a cultured milk beverage is taken, it is effective not only to increase the viable count of lactic acid bacteria in the cultured milk beverage but also to choose a particular culture having good intestine reachability. Despite the fact that cultures excellent from such a viewpoint have already been ascertained, it has heretofore been unable to have a cultured milk beverage contain a lactic acid bacterium having good intestine reachability in any sufficient amount due to its adverse effects on the flavor and taste.

SUMMARY OF THE INVENTION

An object of this invention is therefore to provide a preferred cultured milk beverage which contains a particular type of lactic acid bacterium having good intestine reachability at a high level and is excellent in the quality of flavor and taste and also in stability, and also to furnish its production process.

In one aspect of this invention, there is thus provided a cultured milk beverage containing a type of lactic acid bacterium selected from the group consisting of *Lactobacillus casei, Lactobacillus acidophilus, Lactobacillus helveticus* and *Lactobacillus jugurti*, comprising:

at least $3 \times 10^8$ cells/ml of at least one type of the lactic acid bacteria; and a mixture of a galactooligosaccharide, which is represented by the following formula:

$$Gal\text{-}(Gal)_n\text{-}Glc$$

wherein Gal means a galactose residual group, Glc denotes a glucose residual group, and n stands for an integer of 1–4, and a galactosyldisaccharide represented by the following formula:

$$Gal\text{-}R$$

wherein R means a galactose residual group or a glucose residual group, and Gal has the same meaning as defined above, said galactosyldisaccharide being other than lactose.

In another aspect of this invention, there is also provided a process for the production of a cultured milk beverage. The process comprises providing at least one type of lactic acid bacterium selected from the group of the above lactic acid bacteria, culturing the same to a population of at least $3 \times 10^8$ cells/ml of the cultured milk beverage, and then adding to the resultant culture a mixture of the galactooligosaccharide and the galactosyldisaccharide.

The cultured milk beverage according to the present invention contains the particular type of lactic acid bacterium of good intestine reachability in the large amount and can hence deliver a number of lactic acid bacterium cells into the intestine in a viable state and, moreover, has good flavor and taste suited for many consumers. It is therefore an excellent beverage.

DETAILED DESCRIPTION OF THE INVENTION AND PREFERRED EMBODIMENTS

The specific types of lactic acid bacterium which the cultured milk beverage of this invention can contain, namely, *Lactobacillus casei, Lactobacillus acidophilus, Lactobacillus helveticus* and *Lactobacillus jugurti* are known to have good intestine reachability in many instances, but in general, to tend to afford products having unpleasant flavor and/or taste (especially, sour taste). Cultured milk beverages produced using only one or more of these types of lactic acid bacteria are, therefore, not attractive as general commercial products especially when the viable count is increased to a high level of $1 \times 10^8$ cells/ml or more, no matter how much ingenious efforts are exercised with respect to the kinds and amounts of sweetening and flavor. The combined incorporation of the above galactooligosaccharide and galactosyldisaccharide, however, markedly eliminates unpleasant taste and makes the flavor and taste sufficiently suit the preference of general consumers although its reason is not quite certain.

The galactooligosaccharide included in the cultured milk beverage of this invention is the compound disclosed in U.S. Pat. No. 4,435,389.

On the other hand, the galactosyldisaccharide is the compound disclosed in Japanese Patent Application Laid- Open (Kokai) No. HEI 2-299582, etc. Where it is Gal-Gal, no limitation is imposed on the bonding sites of both galactose residual groups. Where it is GalGlc, the bond between the galactose residual group and the glucose residual group is a $\beta_{1\to 6}$ bond, $\beta_{1\to 3}$ bond or $\beta_{1\to 2}$ bond.

These galactooligosaccharide and galactosyldisaccharide are both well known as substances which act to promote the growth of bifid bacteria. The above-described flavor and taste improving effects brought about by their combination has, however, not been known. When lactose is treated with β-galactosidase produced by *Aspergillus oryzae,* an oligosaccharide mixture containing the above-described galactosyldisaccharide in addition to many oligosaccharides represented by the formula is produced. This oligosaccharide mixture can be used, as it is, for the production of the cultured milk beverage of this invention. Another oligosaccharide mixture usable in the present invention is commercially marketed under the trade name of "Oligomate 50" by YAKULT YAKUHIN KOGYO CO., LTD. This commercial oligosaccharide mixture can also be used, as it is, for the production of the cultured milk beverage of this invention.

To produce the cultured milk beverage of this invention, a starter of the specific type of lactic acid bacterium selected from the above particular lactic acid bacteria is inoculated to a milk medium and is then cultured in a usual manner. The culture, which may be assisted by a desired means as needed, is conducted until the viable count of lactic acid bacterium cells as calculated in terms of the final product reaches $3\times 10^8$ cells/ml. The resultant culture is then subjected to conventional treatment which is needed to provide the cultured milk beverage.

The galactooligosaccharide and galactosyldisaccharide can be added either together with or separately from other additives such as sweetening and flavor or, as an alternative, at any desired stage after the completion of the lactic acid fermentation. They can be added suitably in a total amount of about 0.01–0.3 g per ml of the cultured milk beverage provided that the ratio of the galactooligosaccharide to the galactosyldisaccharide ranges from 1:9 to 9:1.

The present invention will next be described in further detail by the following experiment and examples. It is however to be noted that the present invention shall not be limited to or by them.

EXPERIMENT 1

(1) Glucose and yeast extract were added as growth promoters to a 10% skim milk solution, whereby a lactic acid bacterium culture medium was prepared. With the culture medium, the final viable number of lactic acid bacterium cells was adjustable by changing the amount of the yeast extract to be added. To portions of the lactic acid bacterium culture medium, various types of lactic acid bacteria were inoculated singly and in combinations, respectively. They were cultured at 37° C. so that culture broths of the lactic acid bacteria were obtained.

(2) The culture broths obtained above under Procedure (1) were added with syrup (an aqueous sucrose solution) and flavor and then mixed for homogenization, whereby cultured milk beverages having a sucrose concentration of 14% were produced.

To evaluate the flavor and taste of the thus obtained cultured milk beverages, organoleptic evaluation by a panel of 10 experts was conducted for any unpleasant fermentation flavor and taste in accordance with the following ranking standard. The results are shown in Table 1.

TABLE 1

| Lactic acid bacterium* | Viable count (cells/ml)** | | | | |
|---|---|---|---|---|---|
| | $1 \times 10^7$ | $1 \times 10^8$ | $3 \times 10^8$ | $5 \times 10^8$ | $1 \times 10^9$ |
| S. thermophilus | — | — | — | — | — |
| L. casei | — | ± | + | ++ | +++ |
| L. acidophilus | — | ± | + | ++ | +++ |
| Mixed LC bacterium 1 | — | — | ± | + | ++ |
| Mixed LC bacterium 2 | — | ± | + | ++ | +++ |
| Mixed LC bacterium 3 | — | ± | + | ++ | +++ |

Ranking standard:

| Ranking | Description |
|---|---|
| +++ | Very strong unpleasant fermentation flavor and taste |
| ++ | Relatively strong unpleasant fermentation flavor and taste |
| + | Slight unpleasant fermentation flavor and taste |
| ± | Extremely weak unpleasant fermentation flavor and taste |
| — | Absolutely no unpleasant fermentation flavor and taste |

*Mixed LC (lactic acid) bacterium 1 is a mixture of S. thermophilus and L. casei, mixed LC bacterium 2 a mixture of S. thermophilus, L. casei and L. helveticus, and mixed LC bacterium 3 a mixture of S. thermophilus, L. casei and L. jugurti.
**The viable counts for mixed LC bacterium 2 and mixed LC bacterium 3 do not include S. thermophilus cells.

As is apparent from the above results, the use of any lactic acid bacterium other than *S. thermophilus* results in marked flavor and taste deterioration when the viable count reaches about $3\times 10^8$ cells/ml or greater.

(3) A mixture of galactooligosaccharides and galactosyldisaccharide (ratio: about 7:3; "Oligomate 50", trade name; product of YAKULT YAKUHIN KOGYO CO., LTD.) was added to the culture broths obtained above under Procedure (1) to give 20% as its concentration in the final products. The syrup was also added to give a sucrose concentration of 10%. It was to make the sweetness of the resulting cultured milk beverages equal to that of the cultured milk beverages produced above in Procedure (2) in view of the sweetness imparted by the galactooligosaccharides and the galactosyldisaccharide that the amount of the syrup was reduced compared to Procedure (2).

To evaluate the flavor and taste of the thus-obtained cultured milk beverages, organoleptic evaluation by a panel of 10 experts was conducted for any unpleasant fermentation flavor and taste in a similar manner to Procedure (2). The results are presented in Table 2.

TABLE 2

| Lactic acid bacterium* | Viable count (cells/ml)** | | | | |
|---|---|---|---|---|---|
| | $1 \times 10^7$ | $1 \times 10^8$ | $3 \times 10^8$ | $5 \times 10^8$ | $1 \times 10^9$ |
| S. thermophilus | — | — | — | — | — |
| L. casei | — | — | — | ± | + |
| L. acidophilus | — | — | — | ± | + |
| Mixed LC bacterium 1 | — | — | — | — | ± |
| Mixed LC bacterium 2 | — | — | — | ± | ++ |
| Mixed LC bacterium 3 | — | — | — | ± | ++ |

*,**: Same as defined above below Table 1.

Comparing the above results with those of Table 1, it is understood that the addition of the galactooligosaccharide and the galactosyldisaccharide in combination makes it possible to produce a delicious cultured milk beverage even when a lactic acid bacterium having the tendency to produce unpleasant fermentation taste is used.

EXAMPLE 1

A culture medium containing 8% of skim milk, 3% of glucose and 0.1% of yeast extract was heated at 100° C. for 60 minutes so that the culture medium was pasteurized. After the culture medium was cooled, a starter of *Lactobacillus casei* was inoculated and cultured at 37° C.

On the other side, 400 g of the commercial oligosaccharide product containing galactooligosaccharides and galactosyldisaccharides of the above formulae, respectively, "Oligomate 50" (composition: 35% galactooligosaccharides, 15% galactosyldisaccharides, 12% lactose, 38% monosaccharides; trade name, product of YAKULT YAKUHIN KOGYO CO., LTD.) were dissolved in water, whereby a syrup was prepared in a total amount of 540 ml.

The syrup, together with a small amount of flavor, was mixed and homogenized with 460 ml of the culture broth obtained by the above culture, whereby about 1000 ml of a cultured milk beverage having a viable count of *Lactobacillus casei* as many as $5.0 \times 10^8$ cells/ml were obtained. The cultured milk beverage was substantially free of unpleasant fermentation taste and, therefore, was delicious.

EXAMPLE 2

A culture medium containing 8% of skim milk, 3% of glucose and 0.1% of yeast extract was heated at 100° C. for 60 minutes so that the culture medium was pasteurized. After the culture medium was cooled, starters of *Lactobacillus casei* and *Lactobacillus helveticus* were inoculated and cultured at 37° C.

On the other side, 400 g of the commercial oligosaccharide product containing galactooligosaccharides and galactosyldisaccharides of the above formulae, respectively, "Oligomate 50" (composition: 35% galactooligosaccharides, 15% galactosyldisaccharides, 12% lactose, 38% monosaccharides; trade name, product of YAKULT YAKUHIN KOGYO CO., LTD.) were dissolved in water, whereby a syrup was prepared in a total amount of 540 ml.

The syrup, together with a small amount of flavor, was mixed and homogenized with 460 ml of the culture broth obtained by the above culture, whereby about 1000 ml of a cultured milk beverage having a viable count of *Lactobacillus casei* and *Lactobacillus helveticus* as many as $4.0 \times 10^8$ cells/ml were obtained. The cultured milk beverage was substantially free of unpleasant fermentation taste and, therefore, was delicious.

We claim:

1. A process for the production of a cultured milk beverage, which comprises:

culturing at least one lactic acid bacterium selected from the group consisting of *Lactobacillus casei*, *Lactobacillus acidophilus*, *Lactobacillus helveticus* and *Lactobacillus jugurti* to a population of at least $3 \times 10^8$ cells/ml of the cultured milk beverage; and adding to the resultant culture a mixture of a galactooligosaccharide represented by the following formula:

$$\text{Gal-(Gal)}_n\text{-Glc}$$

wherein Gal means a galactose residual group, Glc denotes a glucose residual group, and n stands for an integer of 1–4, and a galactosyldisaccharide represented by the following formula:

$$\text{Gal-R}$$

wherein R means a galactose residual group or a glucose residual group, and Gal has the same meaning as defined above, said galactosyldisaccharide being other than lactose, in an amount effective to improve the flavor and taste of said cultured milk beverage.

2. The process of claim 1, further comprising adding a sweetening additive, and wherein said galactooligosaccharide and said galactosyldisaccharide are present in a ratio of from 1:9 to 9:1 and in an amount of 0.01–0.3 g per ml of said cultured milk beverage.

3. The process of claim 1, wherein said culturing is performed in a culture medium containing skim milk, glucose and yeast extract.

4. The process of claim 3, wherein said culture medium contains from 8 to 10% of skim milk.

5. The process of claim 4, wherein said culture medium contains about 3% of glucose and about 0.1% of yeast extract.

* * * * *